US012580611B2

(12) United States Patent
Ye et al.

(10) Patent No.: US 12,580,611 B2
(45) Date of Patent: Mar. 17, 2026

(54) ENHANCING NON-TERRESTRIAL NETWORK DIRECT-TO-EVERYTHING SERVICE WITH METASURFACES

(71) Applicant: Dell Products L.P., Round Rock, TX (US)

(72) Inventors: Qing Ye, Hopkinton, MA (US); Tejinder Singh, Manotick (CA); Navjot Kaur Khaira, Manotick (CA); Michael J. Healy, Scituate, MA (US)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/739,880

(22) Filed: Jun. 11, 2024

(65) Prior Publication Data

US 2025/0379616 A1      Dec. 11, 2025

(51) Int. Cl.
H04B 7/04         (2017.01)
H01Q 15/00       (2006.01)
(52) U.S. Cl.
CPC ..... H04B 7/04013 (2023.05); H01Q 15/0086 (2013.01)
(58) Field of Classification Search
CPC .......... H04B 1/40; H04B 7/043; H04B 7/145; H04B 7/04013; H01Q 15/22; H01Q 15/24; H01Q 15/0086; H01Q 21/065
See application file for complete search history.

(56) References Cited

U.S. PATENT DOCUMENTS

| | | | | |
|---|---|---|---|---|
| 10,770,790 | B1 * | 9/2020 | Mahanfar ................ | H01Q 3/34 |
| 11,329,375 | B1 | 5/2022 | West et al. | |
| 11,855,745 | B2 * | 12/2023 | Schloemer ......... | H04B 7/18513 |

(Continued)

FOREIGN PATENT DOCUMENTS

| | | |
|---|---|---|
| CN | 117768269 A | 3/2024 |

OTHER PUBLICATIONS

Qorvo.com, "CMD262 26-28 GHz (Ka Band) GaN Power Amplifier", Rev-A, URL- https://www.qorvo.com/products/p/CMD262, Jun. 14, 2022, 1 page.

(Continued)

*Primary Examiner* — Tung X Le
(74) *Attorney, Agent, or Firm* — Amin, Turocy & Watson, LLP

(57) ABSTRACT

The technology described herein is directed towards a metasurface (reconfigurable intelligent surface) that can be used to redirect signals to and from non-terrestrial network satellites. The metasurface can be passive, and provide signal array gain with respect to indoor user equipment sending and receiving signals to and from the network satellites. The metasurface can be portable for use in various scenarios. Further, the metasurface can be configured to operate in a transmission mode, in which incoming signal is passed through the metasurface, or can be reconfigured to operate in a reflection mode, in which incoming signal is reflected by the metasurface. Different phase shifts of the metasurface's unit cells result in array gain through constructive interference, by refraction in the transmission mode, or reflection in the reflection mode. The presence or absence of a removable back plane determines the transmission or reflection operating mode of the metasurface.

20 Claims, 13 Drawing Sheets

(56) References Cited

U.S. PATENT DOCUMENTS

| | | | | |
|---|---|---|---|---|
| 2016/0112117 | A1* | 4/2016 | Platzer | H04W 24/02 |
| | | | | 370/316 |
| 2019/0334228 | A1 | 10/2019 | Haridas et al. | |
| 2022/0026524 | A1 | 1/2022 | Maruyama et al. | |
| 2022/0231411 | A1 | 7/2022 | Lin | |
| 2023/0142735 | A1 | 5/2023 | Raghavan et al. | |
| 2024/0014862 | A1* | 1/2024 | Duan | H04B 7/04013 |
| 2024/0364019 | A1 | 10/2024 | Hussain | |
| 2025/0062529 | A1 | 2/2025 | Nathan et al. | |
| 2025/0125525 | A1* | 4/2025 | Rossanese | H04B 7/0617 |
| 2025/0274165 | A1* | 8/2025 | Manolakos | H04L 25/0224 |

OTHER PUBLICATIONS

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.

Long et al., "Active Reconfigurable Intelligent Surface Aided Wireless Communications", IEEE Transactions on Wireless Communications, vol. 20, No. 8, Aug. 2021, pp. 4962-4975.

Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.

Gros et al., "A Reconfigurable Intelligent Surface at mmWave Based on a Binary Phase Tunable Metasurface", IEEE Open Journal of the Communications Society, vol. 2, 2021, pp. 1055-1064.

Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.

Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.

Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.

Ojaroudi et al., "Graphene-Based Reconfigurable Intelligent Meta-Surface Structure for THz Communications", 15th European Conference on Antennas and Propagation, 2021, 5 pages.

Tasci et al., "A New RIS Architecture With a Single Power Amplifier: Energy Efficiency and Error Performance Analysis", IEEE Access, Apr. 2022, 11 pages.

Bai et al., "RIS-Assisted Green Secure Communications: Active RIS or Passive RIS?", IEEE Wireless Communications Letters, Dec. 6, 2022, 5 pages.

Goldman et al., "SpaceX and T-mobile Focus on Direct Satellite-to-Smartphone to Improve Mobile Coverage in Remote Areas", Analysys Mason, Aug. 2022, 5 pages.

Jewett, Rachel, "How Big is the Satellite Industry's Direct-to-Device Opportunity?", Via Satellite, Sep. 12, 2023, Url-https://www.satellitetoday.com/connectivity/2023/09/12/how-big-is-the-satellite-industrys-direct-to-device-opportunity/, Retrieved from the internet Dec. 2, 2024, 4 pages.

"Electromagnetic Metasurface", Wikipedia, URL- https://en.wikipedia.org/wiki/Electromagnetic_metasurface#, Retrieved from the internet Dec. 2, 2024, 9 pages.

Schweber, Bill., "The Doppler Effect: From Highly Ridiculed to Absolutely Indispensable, Part 1", Electrical Engineering News and Products, Apr. 19, 2022, URL- https://www.eeworldonline.com/the-doppler-effect-from-highly- ridiculed-to-absolutely-indispensable-part-1/, Retrieved from the internet Dec. 2, 2024, 14 pages.

"Doppler Effect", Wikipedia, URL-https://en.wikipedia.org/wiki/Doppler_effect, Retrieved from the internet Dec. 2, 2024, 8 pages.

Long et al., "A Promising Technology for 6G Wireless Networks: Intelligent Reflecting Surface", Journal of Communications and Information Networks, vol. 6, No. 1, Mar. 2021, 16 pages.

Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.

Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.

Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.

3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.

3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.

3GPP TS 38.108 V17.0.0, 3rd Generation Partnership Project; Technical Specification Group Radio Access Network; NR; Satellite Access Node radio transmission and reception, (Release 17), Jun. 2022, 58 pages.

"DVB", Wikipedia, URL-https://en.wikipedia.org/wiki/DVB, Retrieved from the internet Dec. 2, 2024, 12 pages.

"DVB-S", Wikipedia, URL-https://en.wikipedia.org/wiki/DVB-S, Retrieved from the internet Dec. 2, 2024, 2 pages.

"DVB-S2", Wikipedia, URL-https://en.wikipedia.org/wiki/DVB-S2, Retrieved from the internet Dec. 2, 2024, 7 pages.

"DVB-S2X", Wikipedia, URL-https://en.wikipedia.org/wiki/DVB-S2X, Retrieved from the internet Dec. 2, 2024, 2 pages.

The AD HOC Group., "White Paper on the use of DVB-S2X for DTH Applications, DSNG & Professional Services, Broadband Interactive Services and VL-SNR applications", Digital Video Broadcasting, Mar. 2015, 16 pages.

Dvb Org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.

DVB Org., "Second Generation Framing Structure, Channel Coding and Modulation Systems for Broadcasting, Interactive Services, News Gathering and Other Broadband Satellite Applications; Part 2: DVB-S2 Extensions (DVB- S2X)", DVB Document A083-2 Rev.4, Feb. 2024, 166 pages.

"Facts and Figures 2022—Mobile Network Coverage 2022", ITU, URL—https://www.itu.int/itu-d/reports/statistics/2022/11/24/ff22-mobile-network-coverage/, Retrieved from the internet Dec. 2, 2024, 4 pages.

Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.

ETSI EN 300 421 V1.1.2, "Digital Video Broadcasting (DVB); Framing Structure, Channel Coding and Modulation for 11/12 Ghz Satellite Services", Aug. 1997, 24 pages.

ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.

ETSI EN 302 307 V1.2.1, Digital Video Broadcasting (DVB); Second Generation Framing Structure, Channel Coding And Modulation Systems for Broadcasting, Interactive Services, News Gathering and Other Broadband Satellite Applications (DVB-S2), Aug. 2009, 78 pages.

ETSI TR 102 376-1 V1.2.1, "Digital Video Broadcasting (DVB); Implementation Guidelines for the Second Generation System For Broadcasting, Interactive Services, News Gathering and other Broadband Satellite Applications; Part 1: DVB-S2", Nov. 2015, 118 pages.

(56)                    References Cited

OTHER PUBLICATIONS

ETSI TR 102 376-2 V1.2.1, "Digital Video Broadcasting (DVB); Implementation Guidelines for the Second Generation System for Broadcasting, Interactive Services, News Gathering and other Broadband Satellite Applications; Part 2: S2 Extensions (DVB-S2X)", Jan. 2021, 212 pages.

Lee et al., "Integrated DVB-X2 Receiver Architecture with Common Acceleration Engine", Applied Sciences, vol. 9, No. 3983, Sep. 23, 2019, 16 pages.

Nemer, Elias., "Physical Layer Impairments in DVB-S2 Receivers", Second IEEE Consumer Communications and Networking Conference, 2005, pp. 487-492.

DVB Org., "White Paper on the use of DVB-S2X for DTH applications, DSNG & Professional Services, Broadband Interactive Services and VL-SNR applications", DVB Document A172, Mar. 2015, 16 pages.

Babcock, Stephen., "AT&T Invested $450M in Maryland Network Upgrades Over 3 Years", Technical.ly, URL-https://technical.ly/startups/att-invested-450m-in-maryland-network-upgrades-over-3-years/, Jul. 9, 2019, Retrieved from the internet Dec. 2, 2024, 7 pages.

Tyree et al., "AT&T Providing Cell on Wheels to Help with Internet Connection at LU's Graduation", URL- https://wset.com/news/local/att-providing-cell-on-wheels-to-help-with-internet-connection-at-lus-graduation, May 10, 2017, Retrieved from the internet Dec. 2, 2024, 6 pages.

ITU, "H.222.0 : Information Technology-Generic Coding of Moving Pictures and Associated Audio Information: Systems", International Telecom Union, Aug. 2018, 306 pages.

Cioni et al., "DVB-S2X Physical Layer Performance Results Over Realistic Channel Models", International Journal of Satellite Communications and Networking, vol. 34, No. 3, Jul. 2015, 21 pages.

"MPEG Transport Stream", Wikipedia, URL-https://en.wikipedia.org/wiki/MPEG_transport_stream, Retrieved from the internet Dec. 2, 2024, 10 pages.

Keese, Col. John E., "Satellite Telemetry, Tracking and Control Subsystems", Massachusetts Institute of Technology, Oct. 29, 2003, 35 pages.

NASA, "State-of-the-Art of Small Spacecraft Technology", NASA 9.0 Communications, Feb. 12, 2024, 32 pages.

Stuhlfauth, Reiner. "5G NTN Takes Flight: Technical Overview of 5G Non-Terrestrial Networks", Rohde & Schwarz, White Paper, Version 01.00, 2022, 124 pages.

Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.

"Aerial SDK Layer 1" NVIDIA DOCS HUB, https://docs.nvidia.com/aerial/archive/aerial-sdk/23-1/text/product_brief/aerial_sdk_layer_1.html] retrieved Jan. 16, 2025, 30 pages.

Healy, et al. "LAYER-1 Physical Interface Transcoder Leveraging Metasurfaces" U.S. Appl. No. 18/899,886, filed Sep. 27, 2024, 63 pages.

Healy, et al. "Connecting Wi-Fi-Enabled Device To Non-Terrestrial Satellite Constellations" U.S. Appl. No. 18/899,909, filed Sep. 27, 2024, 55 pages.

Khaira, et al. "LAYER-1 Physical Interface Transcoder With Signal Processing Capabilities To Support Hybrid Terrestrial and Non-Terrestrial Ground and Space Mesh Network" U.S. Appl. No. 18/902,052, filed Sep. 30, 2024,79 pages.

Healy, et al. "Universal LAYER-1 Physical Interface Transcoder for Terrestrial and Non-Terrestrial Air-Interfaces" U.S. Appl. No. 18/899,739, filed Sep. 27, 2024, 62 pages.

Singh, et al. "Metasurface Integrated Non-Terrestrial Network Transcoder With Adaptive Slicing for Dynamic Allocation of Mesh Resources" U.S. Appl. No. 18/902,100 filed Sep. 30, 2024, 64 pages.

Singh, et al. "Edge Computing and Metasurfaces in Non-Terrestrial Network-Connected Transcoder Nodes" U.S. Appl. No. 18/902,158 filed Sep. 30, 2024, 66 pages.

Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.

Singh, et al. "Allocating Primary and Secondary Metasurface Integrated Non-Terrestrial Network Transcoder Nodes" U.S. Appl. No. 18/902,360, filed Sep. 30, 2024, 64 pages.

Healy, et al. "Model-Controlled LAYER-1 Physical Interface Transcoder To Support Hybrid Terrestrial and Non-Terrestrial Ground and Space Mesh Network" U.S. Appl. No. 18/899,504, filed Sep. 27, 2024, 64 pages.

Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.

Singh, et al. "Secure Non-Terrestrial Network Links Utilizing Quantum Key Distribution Integrated Into a Metasurface Transcoder Node With Hardware Polarization Control" U.S. Appl. No. 18/902,422, filed Sep. 30, 2024, 37 pages.

Singh, et al. "Signal Correction Based On Environmental Factors in Metasurfaces for Non-Terrestrial Network Transcoder Nodes" U.S. Appl. No. 18/902,454, filed Sep. 30, 2024, 53 pages.

Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

Khaira, et al. "Energy-Efficient Active Reconfigurable Intelligent Surface With Selective Amplification" U.S. Appl. No. 18/609,134 filed Mar. 19, 2024, 39 pages.

Singh, et al. "Reconfigurable Intelligent Surface Integrated On Compact Drones for Wireless Network Survey" U.S. Appl. No. 18/913,434, filed Oct. 11, 2024, 36 pages.

Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.

Singh, et al. "Reconfigurable Intelligent Surfaces That Self Heal and Adapt By Altering the Tile Geometry" U.S. Appl. No. 18/656,431, filed May 6, 2024, 74 pages.

Singh, et al. "Predictive Signal Boosting in Distributed Tile Controllers for Reconfigurable Metasurfaces" U.S. Appl. No. 18/656,441, filed May 6, 2024, 54 pages.

Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.

Healy, et al. "Transcoding the Air-Interface Between Non-Terrestrial and Terrestrial Networks Leveraging Integrated Transcoder and Metasurface Mounted On a Drone" U.S. Appl. No. 18/780,254, filed Jul. 22, 2024, 61 pages.

Healy, et al. "Communication Between Non-Terrestrial and Terrestrial Networks Based On LAYER-1 Physical Packet-Level Transcoding" U.S. Appl. No. 18/780,269, filed Jul. 22, 2024, 59 pages.

Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.

Notice of Allowance received for U.S. Appl. Serial No. 18/609,134 dated Sep. 16, 2025, 11 pages.

Non-Final Office Action received for U.S. Appl. No. 18/656,441 dated Sep. 22, 2025, 7 pages.

Notice of Allowance received for U.S. Appl. No. 18/656,441 dated Nov. 19, 2025, 5 pages.

Notice of Allowance received for U.S. Appl. No. 18/797,975 dated Sep. 19, 2025, 9 pages.

* cited by examiner

Incoming
signal

Transmitted
Signal

Reflected
Signal

440

440

555

ENHANCING NON-TERRESTRIAL NETWORK DIRECT-TO-EVERYTHING SERVICE WITH METASURFACES

BACKGROUND

Non-terrestrial network communications are defined as part of fifth generation (5G) communications in current third generation partnership project (3GPP) standards. However, the reliability of non-terrestrial network satellite direct-to-device service is problematic when a user equipment (UE) moves to an indoor environment, due to various radio frequency signal attenuations introduced by a roof, wall, or other physical structures that are between a satellite and the UE. As such, present satellite communication (non-terrestrial network) services basically require a line-of-sight (LOS) path between a satellite and a user equipment device to reduce radio frequency signal fading or shadowing in order to provide reliable communication.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
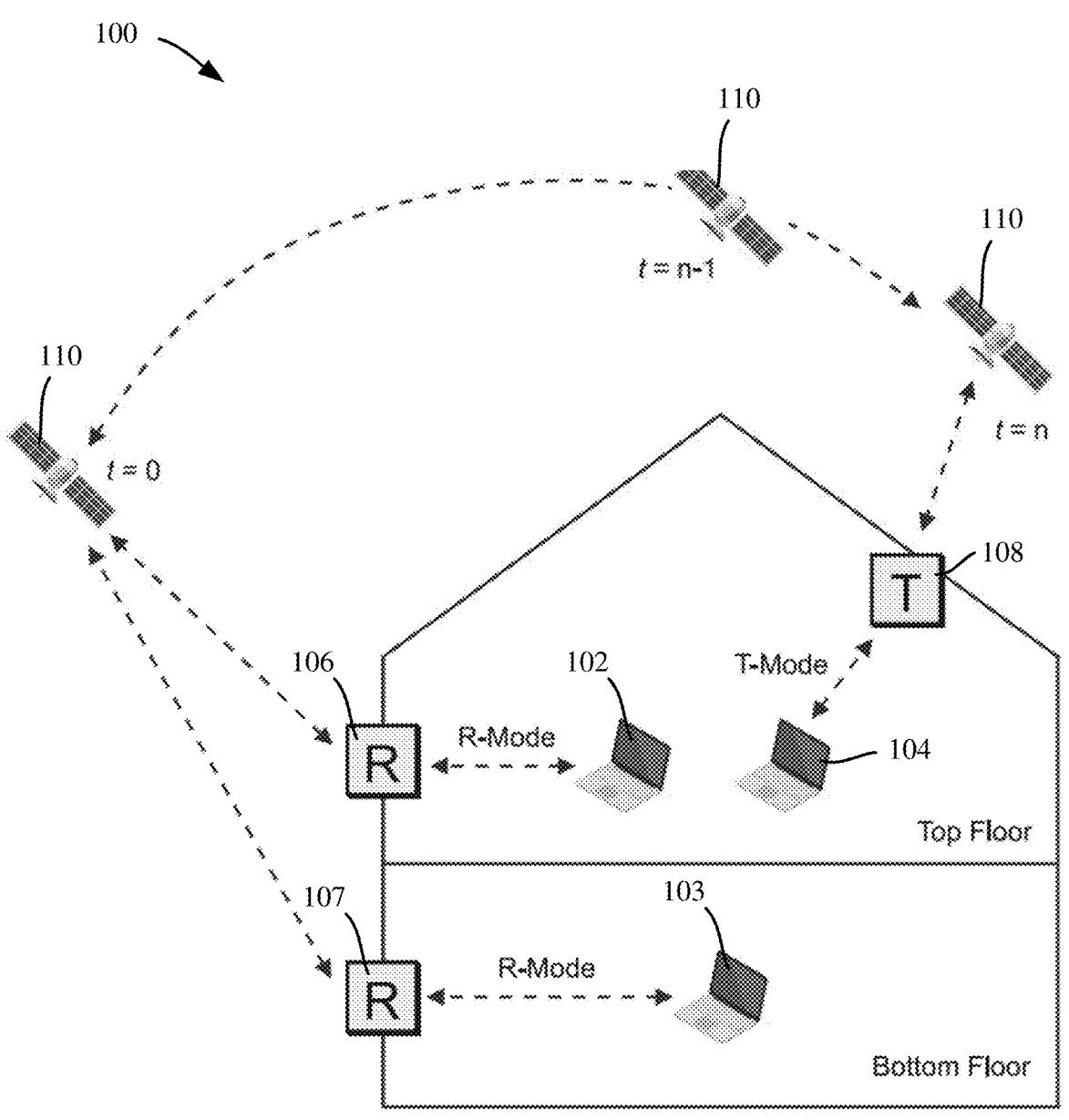
FIG. 1 is a representation of multiple example locations for deploying a metasurface indoors, including metasurfaces configured to operate in a transmission mode and reflection mode, in accordance with various example embodiments and implementations of the subject disclosure.

The technology described herein is generally directed towards a metasurface (sometimes referred to as a reconfigurable intelligent surface, or RIS) of unit cells deployed between a satellite and a user equipment (UE). The metasurface can be configured to act as a passive signal gain booster to provide a reliably connected non-terrestrial network service, including in indoor UE scenarios. There is significant signal attenuation experienced by non-terrestrial network services with respect to penetrating indoor environments. Such variability in attenuation, influenced by construction materials and their moisture content, impedes the reliability and performance of direct-to-device connections. This attenuation can range from minimal to severe, ranging from 3 dB (50%) to virtually complete attenuation; for example, metal roofing and attics equipped with radiant barriers present the most challenging conditions, exhibiting signal losses up to 30 dB (99.9% reduction).

To counteract such signal attenuation challenges, the integration of metasurface technology as described herein facilitates non-terrestrial network direct-to-everything service reliability, by using a (for example portable) designed metasurface to boost the attenuated RF signals to and from a satellite, to ensure an end-to-end link supporting always-on connectivity. In general, metasurfaces are surfaces engineered to manipulate electromagnetic waves, offering a pathway to enhance signal strength in either reflection or transmission modes. A metasurface such as described herein can be designed in a way that reduces the fabrication costs exponentially relative to other technologies, as in general a metasurface only needs a single layer of metallization on a substrate. The metasurface can be used for direct-to-everything (DTX) communications, including with smartphones, laptops, automotive vehicles, IoT devices, or inter-device communication, as long as the operating RF frequency is within the gain band of specially designed metasurface.

One implementation of the technology described herein includes a passive (no power needed) metasurface that can be reconfigured into reflection mode or transmission mode by simply attaching or removing a metallic backplane to or from the metasurface. More particularly, a passive metasurface signal booster does not require power to function, and the reconfiguration to the reflection mode can be achieved by attaching a metallic back plane panel to the underside of the metasurface, or removing the back plane to achieve transmission mode. These designs add additional benefits to ensure non-terrestrial network connectivity even during a power outage, which is significant for the safety and emergency response community.

In one implementation, the metasurface can be sufficiently small in size so as to be portable, which can be carried when travelling or moved within a building as needed to enhance the signal strength with respect to non-terrestrial network uplink and downlink communications. The portability of the metasurface allows a user to test out multiple candidate positions, using either a transmission mode or a reflection mode of the metasurface within the targeted indoor environment. In this way, the user knows ahead of time that the non-terrestrial network service is not limited to a single spot. This significantly increases the convenience for the user; for example, in a scenario where the roofing material of a target building only has a few dB of attenuation at non-terrestrial network service link frequency, the metasurface booster gain operating in the transmission mode is adequate to compensate for that small loss. This removes the line-of-sight requirement between the user equipment and the satellite field of view. In general, a user can sit anywhere in a room with boosted non-terrestrial network signal through the transmission mode of a suitably placed portable metasurface, which further enhance the flexibility of the non-terrestrial network service.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and metasurfaces in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a representation of an example environment 100 including user equipment 102-104 operating indoors, and metasurfaces 106-108. As described herein, the metasurfaces 106-108 are used to offer signal boost in the 3GPP standardized non-terrestrial network frequency bands. In general, a satellite is always in the (low attenuation) field-of-view of a metasurface with respect to the non-terrestrial network (NTN) frequency bands; before one NTN communications satellite travels out of the field of view, another one moves in. Although only a single satellite 110 is depicted in FIG. 1 (at different times t=0, t=n−1 and t=n), it is understood that at least one satellite is always within the field of view of any of the metasurfaces 106-108.

In FIG. 1, the two reflecting mode ("R") metasurfaces 106 and 107 and one transmission mode ("T") metasurface 108 provide satellite communication signals to and from user equipment, e.g., laptop or notebook computers 102-104. Note that instead of multiple UE computers 102-104, a single computer can be moved among the various coverage locations of the metasurfaces 106-108.

As set forth herein the range of signal attenuation (e.g., in dB/inch) is different for various commonly used building materials such as plywood, clear glass, cinder block, drywall, and ceiling tile; each material's attenuation properties change with frequency. These building materials have lower attenuation (non-negligible) at lower frequencies, however as expected, the attenuation increases as the frequency rises, which indicates that higher frequencies face greater attenuation, which is a challenge for direct-to-device services that operate at these frequencies. However, the metasurfaces 106-108 in FIG. 1 are positioned to mitigate the attenuation issue, e.g., the two reflecting mode ("R") metasurfaces 102 and 103 can be placed by windows or behind other low-attenuation materials, while the transmitting mode metasurface 104 can be placed near the ceiling or in line with a skylight so as to have a reasonable line-of-sight connection (i.e., low attenuation conditions) with any position of any satellite in each metasurface's the field of view.

Satellite communications (satcom) has long been commercialized to provide mobile (aviation, sea, railroad), fixed (isolated rural area), and broadcast services for decades, while the terrestrial network has gone through 2G, 3G, 4G and 5G evolutions. With 3GPP now adding non-terrestrial networks (NTN) in the definition of 5G, satellite direct-to-device (direct-to-device) market is likely to be used with smartphones, sensors, laptops and connected vehicles, where a stable connectivity can be assured between such user equipment and a satellite. Indeed, 3GPP NR-non-terrestrial network standards enable non-terrestrial network direct-to-everything services, by defining a high-level architecture that is compatible with most mobile handsets and internet-of-things (IoT) devices, as well as defining the operating bands in FRI for UE to transmit and receive data with a satellite. The following table shows the satellite operating bands in FRI as defined by 3GPP Release 17:

| Satellite operating band | Uplink (UL) operating band SAN receive/ UE transmit $F_{UL, low}$-$F_{UL, high}$ | Downlink (DL) operating band SAN transmit/UE receive $F_{DL, low}$-$F_{DL, high}$ | Duplex mode |
|---|---|---|---|
| n255 | 1626.5 MHz-1660.5 MHz | 1525 MHz-1559 MHz | FDD |
| n256 | 1980 MHz-2010 MHz | 2170 MHz-2200 MHz | FDD |

Note that 3GPP is currently considering new radio (NR)-non-terrestrial networks above 10 GHz in the FR2 band. The Ka-band is the highest-priority band with uplinks between 17.7 and 20.2 GHz and downlinks between 27.5 and 30 GHz, based on ITU (International Telecommunication Union) information regarding satellite communications frequency use. It is expected that FR2 band will be standardized in the future 3GPP releases.

Figure 2A:
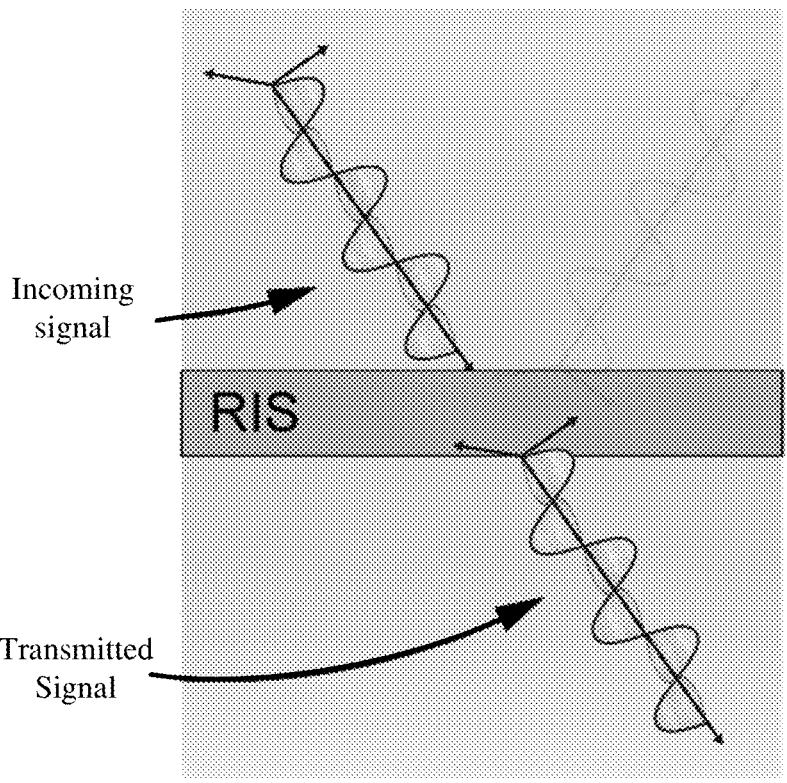
FIGS. 2A and 2B are representations of example metasurfaces configured to operate in a transmission mode and reflection mode, respectively, in accordance with various example embodiments and implementations of the subject disclosure.
Figure 2B:
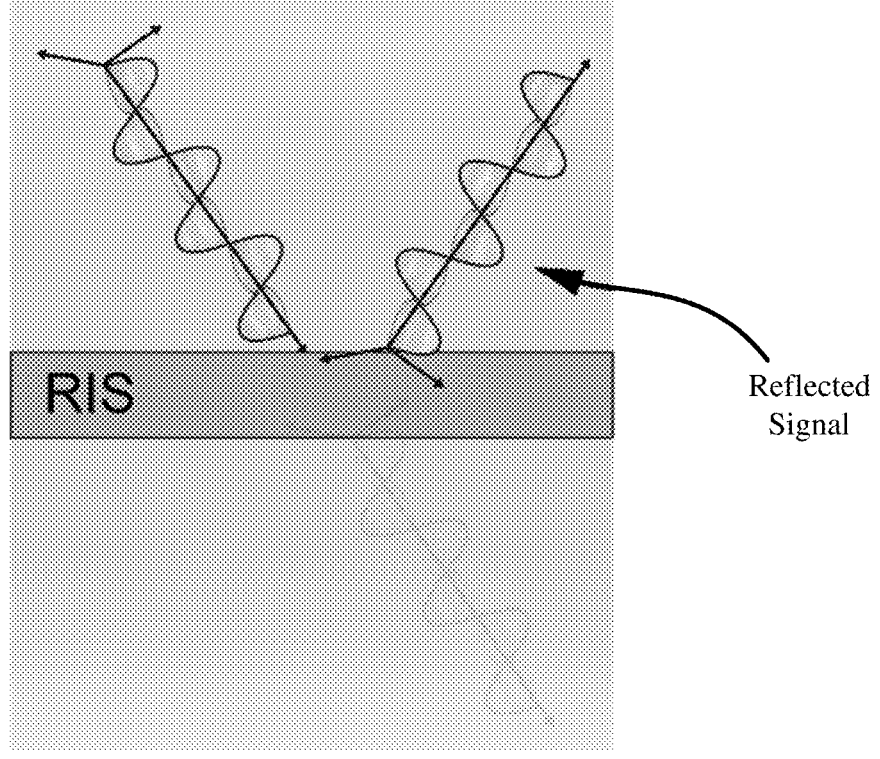

FIGS. 2A and 2B illustrate how an electromagnetic (EM) wave can be redirected by a reflective intelligent surface (RIS), through transmission or reflection, that is, FIGS. 2A and 2B show the concept of a metasurface (reconfigurable intelligent surface, or RIS) in transmission and reflection modes, respectively. As can be seen, in the transmission mode of FIG. 2A, the RIS is basically transparent to the incoming signal, and as described herein (and not explicitly shown in FIG. 2A), respective unit cells of the RIS can be designed with different phase shifts so as to passively refract respective portions of the incoming signals and thereby boost the incoming signal via constructive interference of the different refracted respective portions of the incoming waves as refracted by the respective unit cells. Similarly, in the reflection mode of FIG. 2B, the RIS basically reflects a very large percentage of the incoming signal, and as described herein, the respective unit cells of the RIS can be designed with different respective phase shifts so as to passively reflect respective portions and boost the incoming signal via constructive interference of the different reflected respective portions of the incoming waves as reflected by the respective unit cells.

In one or more example implementations, described herein is a passive portable metasurface that can be manually configured to operate either in reflection mode (R-Mode) or in transmission mode (T-mode) to service various device(s)/UE(s), e.g., as shown in FIG. 1. The portable metasurfaces can be designed in a way to offer signal boost in the 3GPP standardized non-terrestrial network bands without requiring any power source, providing indoor usage scenarios as well as a travel-ready solution for remote areas, and/or during emergency situations when power is not available.

Figure 3:
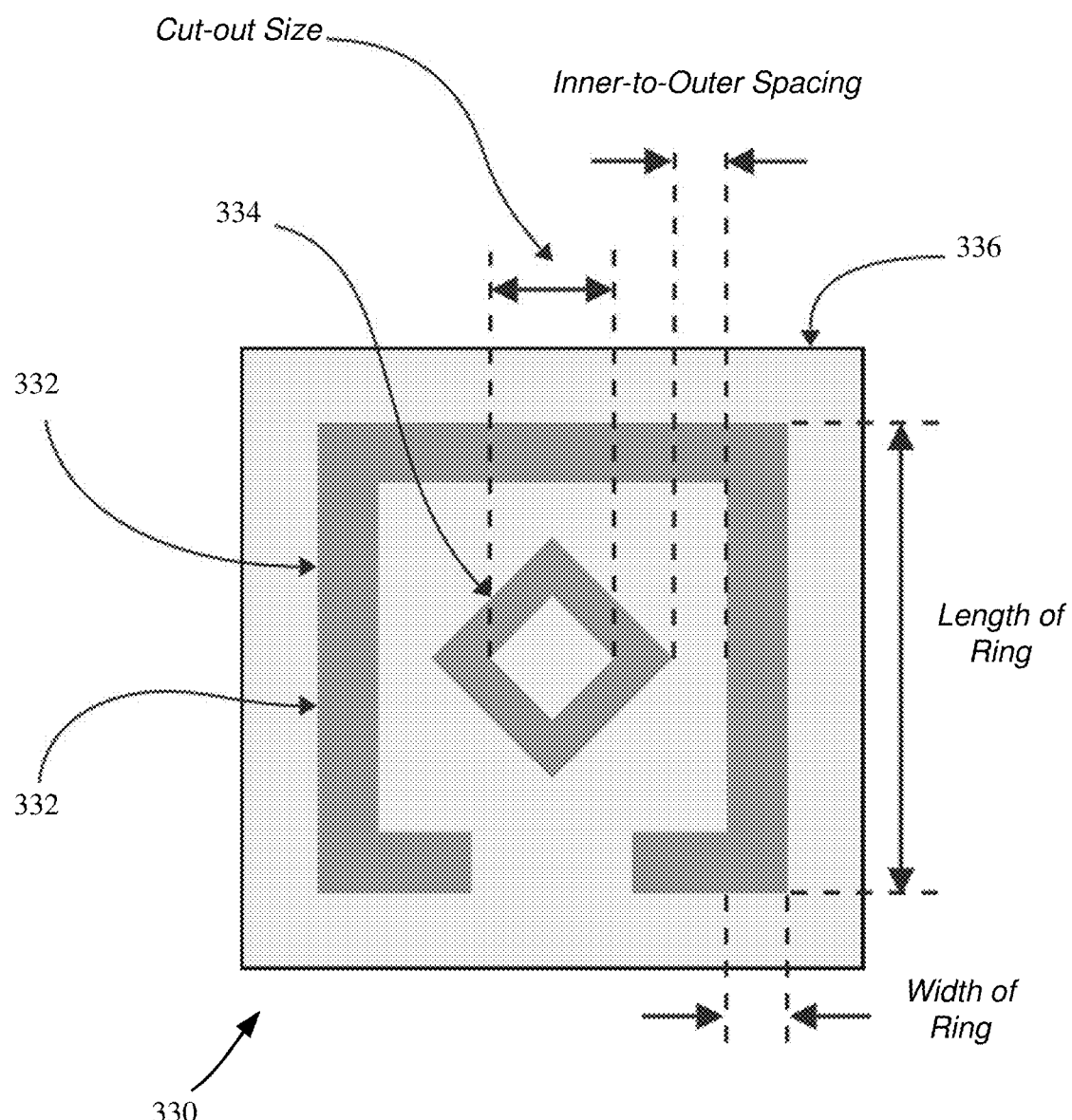
FIG. 3 is an example top view representation of an example unit-cell suitable for use in a metasurface that operates in a transmission mode or a reflection mode, in accordance with various example embodiments and implementations of the subject disclosure.

FIG. 3 shows one example design of a unit cell 330 of a metasurface. In this example, the unit cell 330 has a metallic resonating pattern shaped as square split ring (outer shape 332) with a central rhombus (inner shape 334). The pattern is formed from a thin metal film on a dielectric substrate 336. The dimensions of the unit cell 330 determine the frequency at which the unit cell resonates, and are thus sized based on the frequency band of the incoming signal, e.g., the n255 or n256 satellite bands. Smaller dimensions can be used for higher frequencies, such as millimeter wave/FR2 frequencies. Note that FIG. 3 is only one non-limiting example, and that the metallic resonator pattern of a unit cell can be of any shape and size as long as the metallic resonator pattern resonates at the desired frequency.

Scaling of the rhombus shape, or by rotating the inner shape 334, allows the phase of the unit-cell to be tweaked; in this way, a metasurface's unit cells can be coded as per the phase-codebook of the metasurfaces for beam redirection, given an incoming signal from a known general direction relative to the metasurface, e.g., from the sky for a satellite. Various design dimensions are shown in FIG. 3 to better illustrate the optimization variables. This shape of the unit-cell can be developed on any choice of commonly available dielectrics including but not limited to FR4 laminates, Rogers RF substrates, alumina, sapphire, glass, ceramics, or other non-metallic substrates, as long as the unit-cell shows a resonance peak at the desired frequency.

Figure 4:
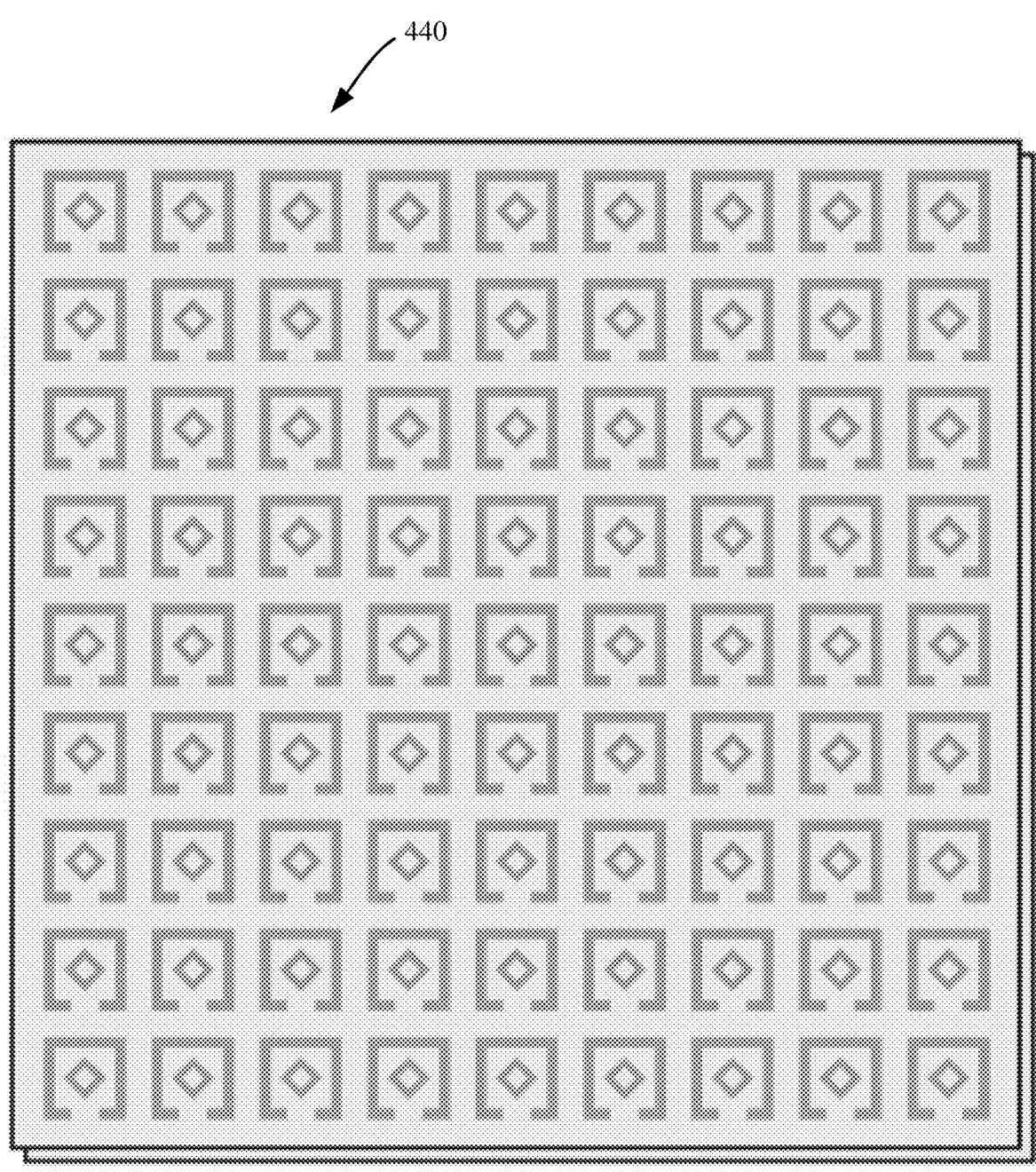
FIG. 4 is an example top view representation of an example metasurface panel that can be configured to operate in a transmission mode or a reflection mode, in accordance with various example embodiments and implementations of the subject disclosure.
Figure 5:
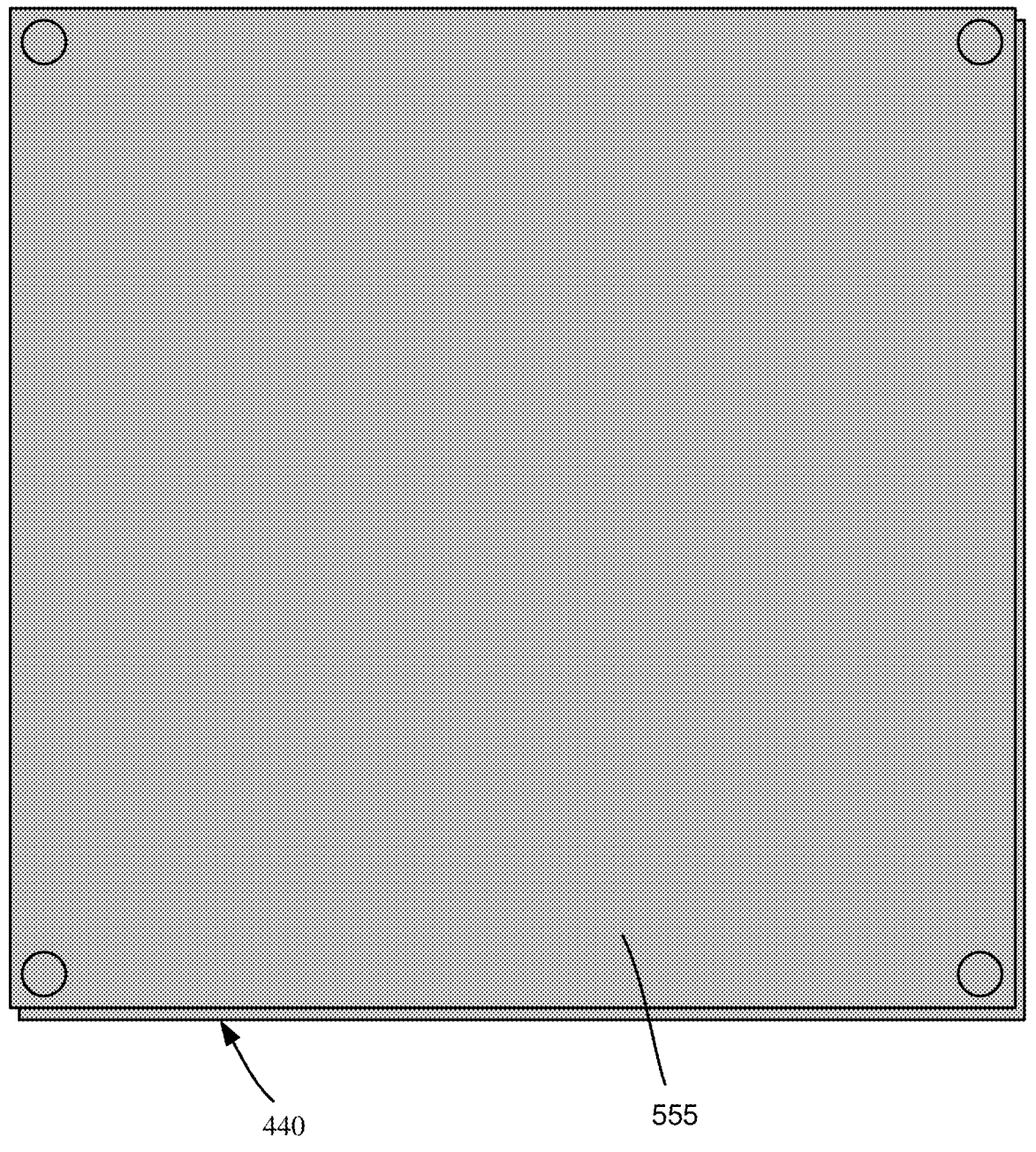
FIG. 5 is an example bottom view representation of the example metasurface panel of FIG. 4, with a metallic backplane attached to operate the metasurface in a reflection mode, in accordance with various example embodiments and implementations of the subject disclosure.
Figure 6:
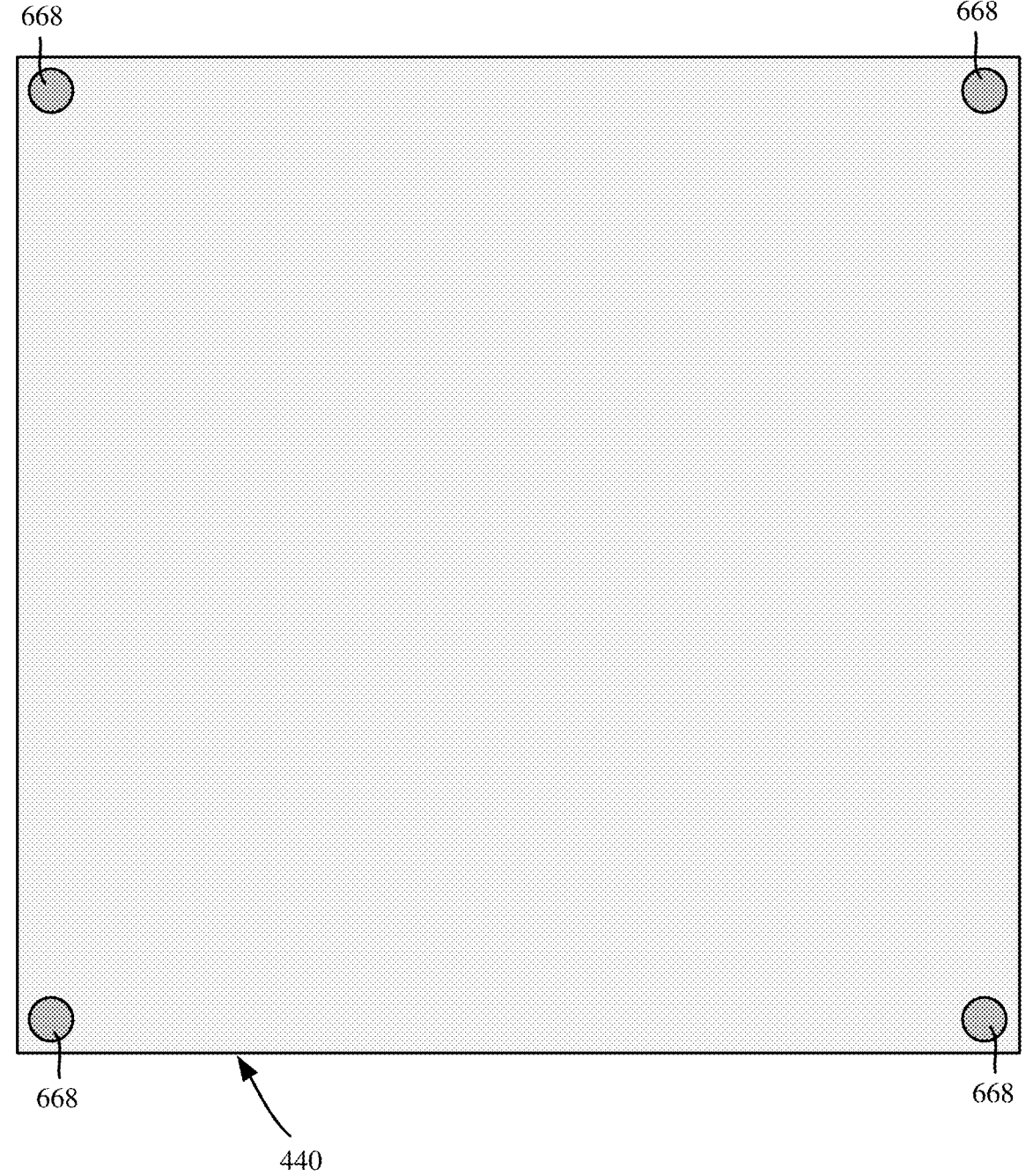
FIG. 6 is an example bottom view representation of the example metasurface panel of FIG. 4, with the metallic backplane removed to operate the metasurface in a transmission mode, in accordance with various example embodiments and implementations of the subject disclosure.

FIGS. 4-6 show the concept of a metasurface 440 of unit cells (top view, FIG. 4) highlighting the manually attachable metal backing plane 555 for reflection mode (R-mode) when attached (FIG. 5). Without the metal backing, that is, when the metal backplane is detached, the panel works in default transmission mode (T-mode), as represented in FIG. 6.

Thus, in one implementation, a complete panel (which can be portable) includes two physical sections; one section is the array of metasurface unit cells (FIG. 4) patterned on a metal layer formed on the dielectric substrate, while the second is a solid metal sheet that functions as a back plane. When the metal panel 555 is attached to the back of the metasurface array as in FIG. 5, the metasurface 440 inherently operates in the reflection mode, bouncing the enhanced signals back in the reflecting direction, allowing signals to be reflected from the panel with improved signal strength due to array gain from constructive interference, resulting from different configured phase shifts of the unit cells. When the metasurface is used without the back plane as in FIG. 6, it operates in a transmission mode, allowing signals to pass through the panel with improved signal strength due to array gain from constructive interference.

In one design implementation, a magnetic attachment system (e.g., with magnets 668 for aligning and attached the metal back plane for the R-mode) is used to couple the back plane 555 to the underside of the unit cell surface, which simplifies the alignment when transitioning between transmissive and reflective operating modes. By simply placing or removing the back plane, a user can switch the metasurface between its two modes of operation, making the system highly adaptable for different communication scenarios.

It should be noted that while such an inexpensive back plane option allows straightforward reconfiguration of the operating modes of a metasurface, this is a non-limiting example. For example, one user may want a ceiling-mounted metasurface for operating only in the transmission mode, and can thus purchase one without a back plane. In contrast, a different user may want a window-mounted backplane for operating only in the reflection mode, and can purchase a metasurface with a fixed (non-detachable) back plane for presumably less cost than a metasurface with a selectively detachable back plane.

Figure 7:
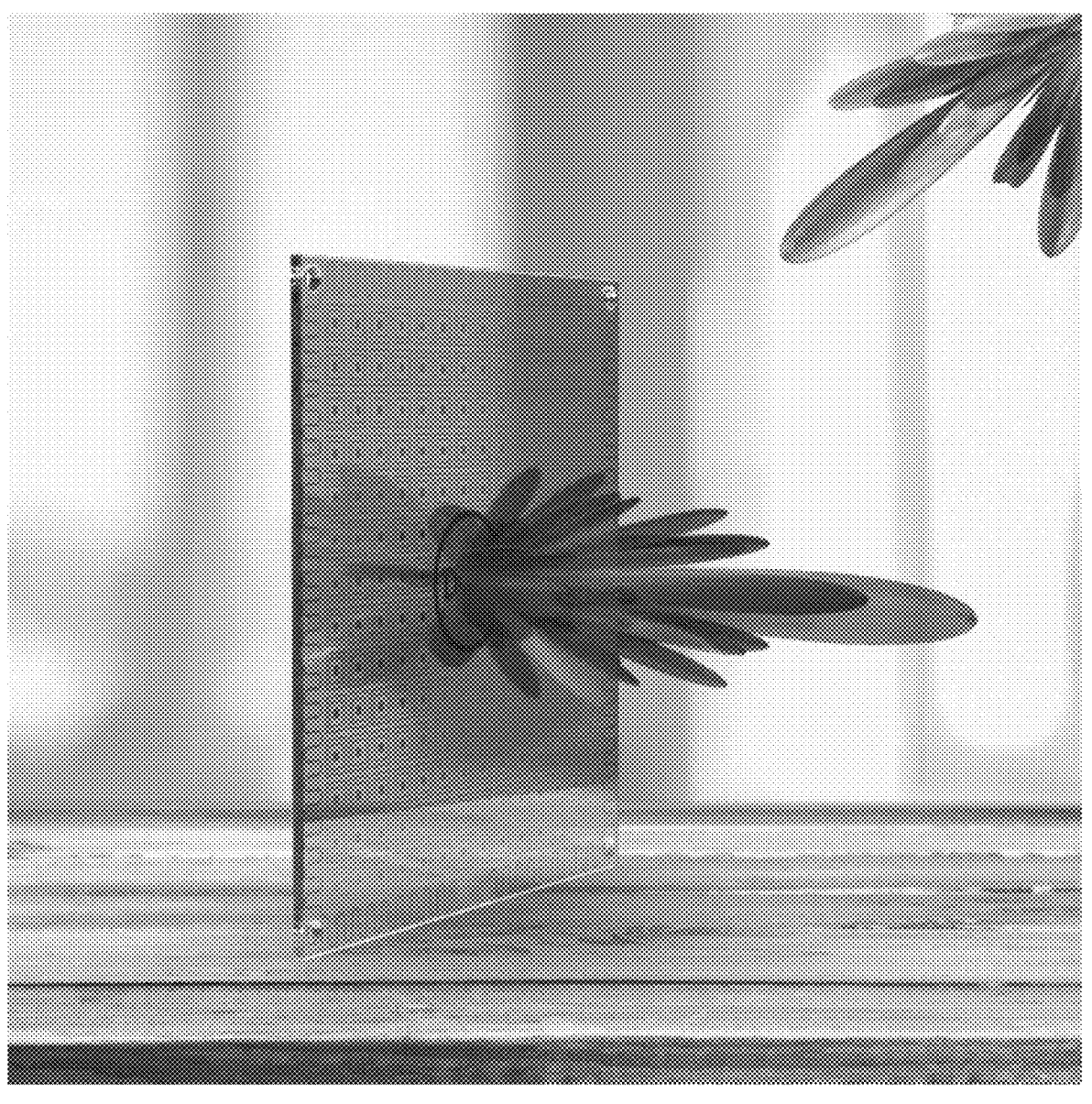
FIG. 7 is a conceptual representation of an example of a metasurface configured to operate in a reflection mode, in accordance with various example embodiments and implementations of the subject disclosure.
Figure 8:
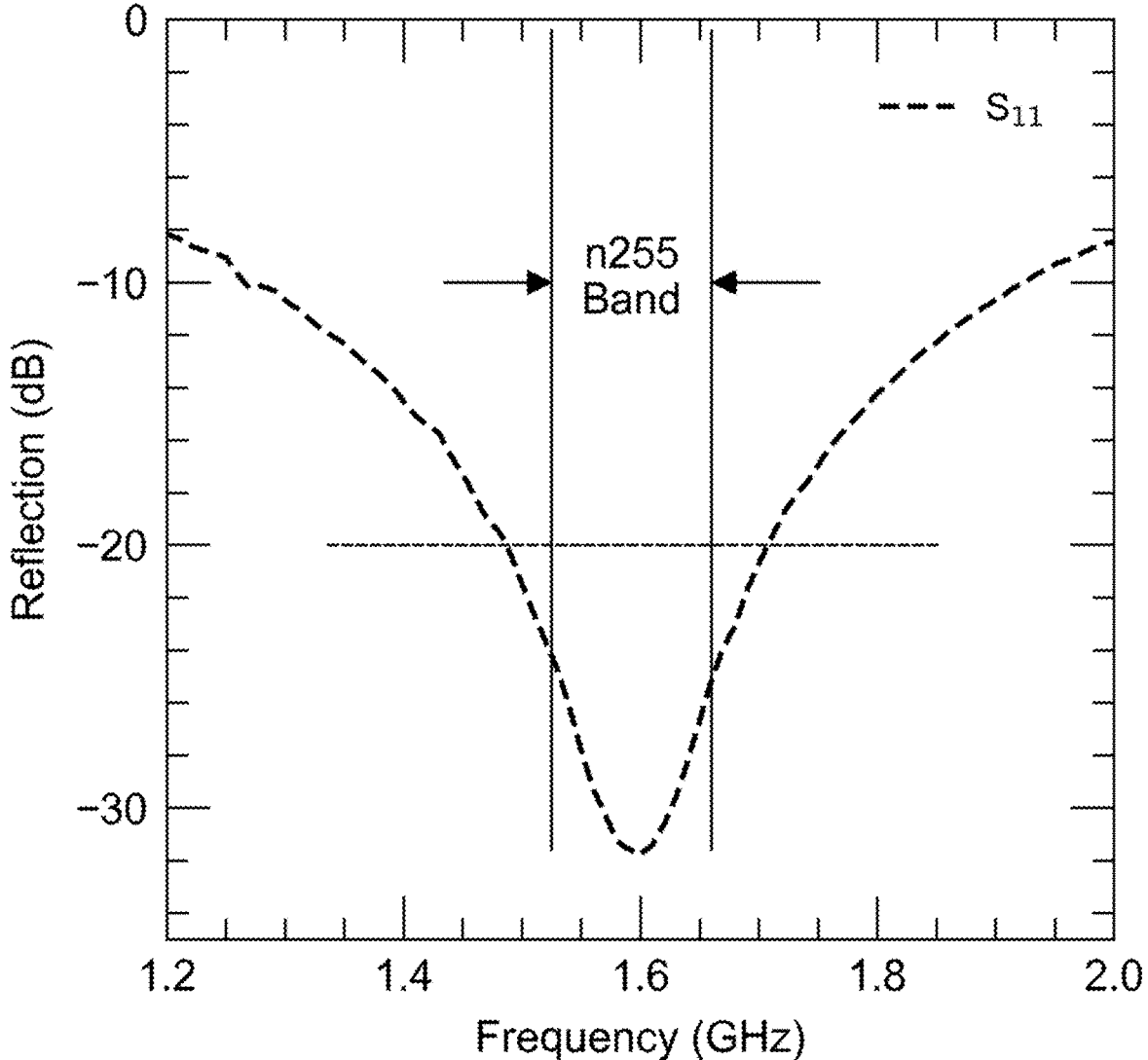
FIG. 8 is a graphical representation of example simulated reflection performance of a unit-cell for a metasurface with a metallic backplane attached for operating in a reflection mode over the n255 frequency band, in accordance with various example embodiments and implementations of the subject disclosure.
Figure 9:
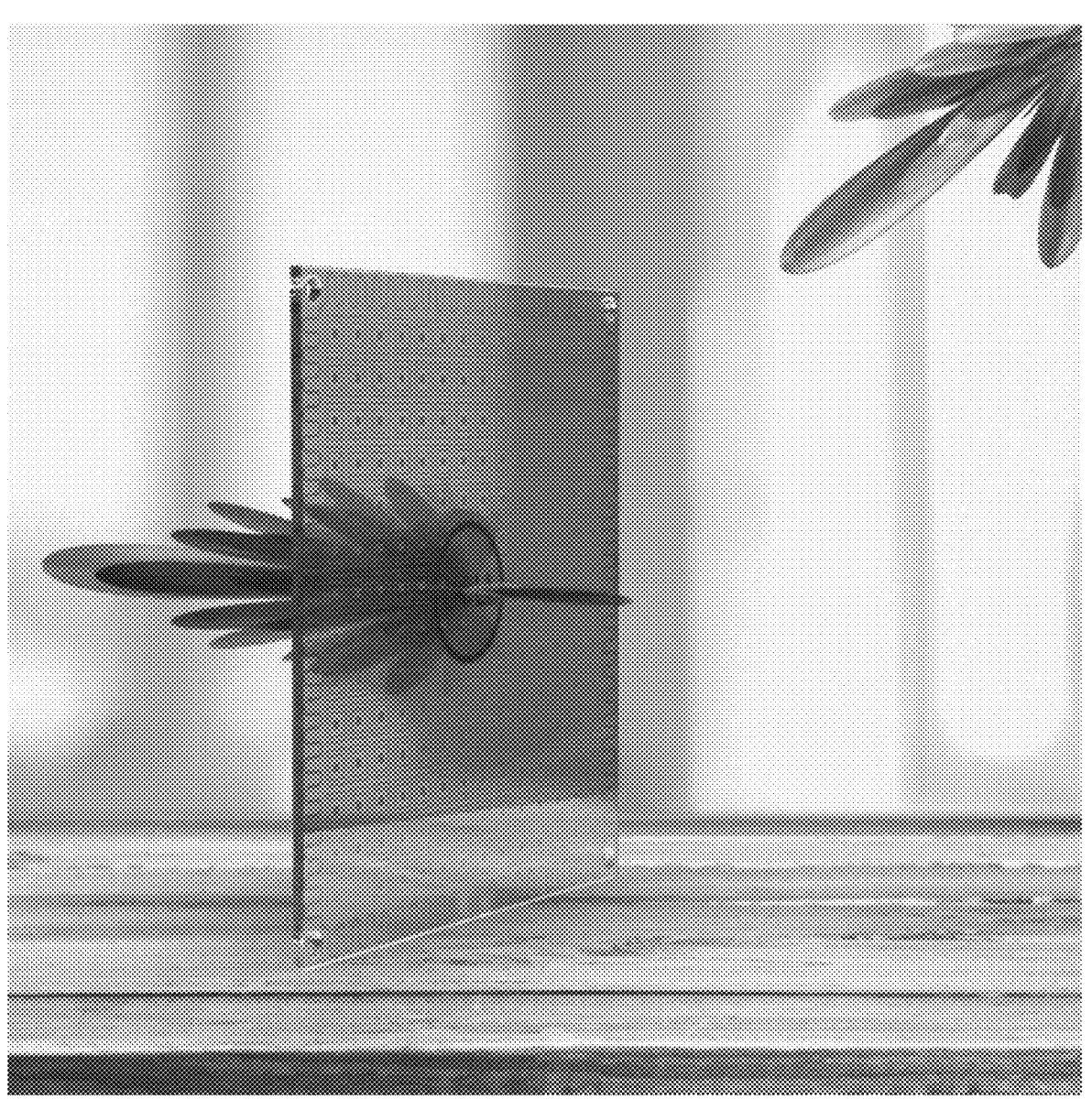
FIG. 9 is a conceptual representation of an example of a metasurface configured to operate in a transmission mode, in accordance with various example embodiments and implementations of the subject disclosure.
Figure 10:
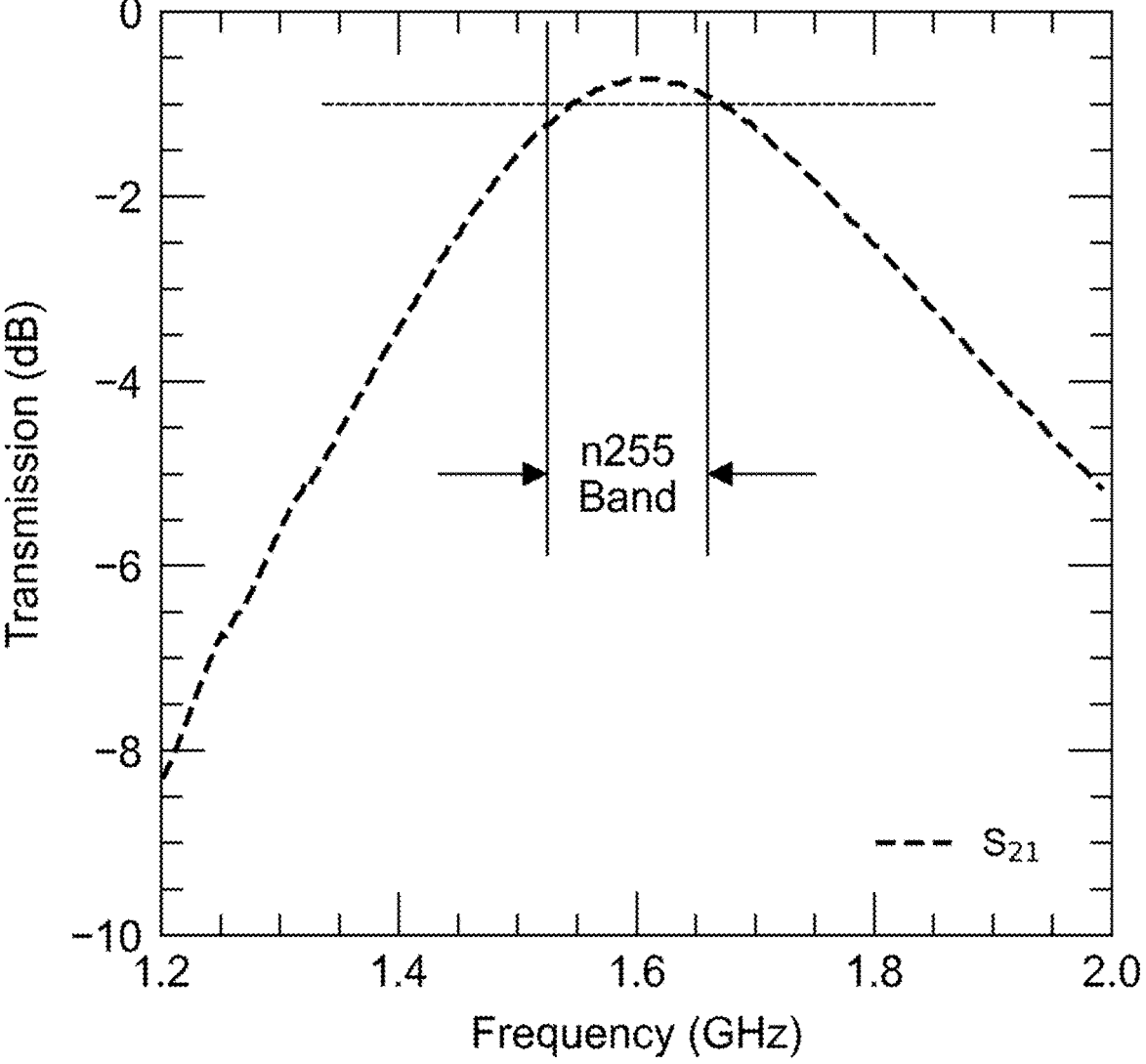
FIG. 10 is a graphical representation of example simulated transmission performance of a unit-cell of a metasurface with no metallic backplane for operating in a transmission mode over the n255 frequency band, in accordance with various example embodiments and implementations of the subject disclosure.

For evaluation purposes, the metasurface parameters were designed for a few frequencies in FR1 and FR2 bands to prove the viability of the technology described herein. One frequency band selected was the n255 band (1.6 GHZ) for its wide adoption in North America, with a portable dual mode metasurface designed to operate between the entire n255 band to cover both uplink and downlink communications. The operation of the designed metasurface in reflection mode along with its optimized performance in the n255 band is shown in FIGS. 7 and 8, and similarly, the metasurface in transmission mode with its performance is depicted in FIGS. 9 and 10. FIG. 7 shows a rendered concept of a metasurface operating in the reflection mode. FIG. 8 shows the EM simulated reflection of the unit-cell for the portable metasurface over the n255 band with the metallic back plane attached.

FIG. 9 shows a rendered concept of a metasurface operating in the transmission mode. FIG. 10 shows the EM simulated transmission of the unit-cell for the portable metasurface over the n255 band with the metallic back plane detached.

The electromagnetic response of the unit cell was evaluated using an industry standard high frequency EM simulation tool. As depicted in FIG. 8, the panel's operation in reflection mode is characterized by a signal reflection magnitude $S_{11}$ of ~−32 dB, indicating that the panel is reflecting nearly all of the incoming signal. Conversely, FIG. 10 illustrates the panel's performance in transmission mode, where the signal transmission magnitude $S_{21}$ is ~−0.7 dB, which means the metasurface panel allows almost all of the incoming signal to pass through.

While the FR2 band has not been standardized yet, for evaluation purposes 19 GHz was selected for uplink communications and 28 GHz for downlink communications. Note that one metasurface that was designed for 28 GHz has experimentally measured a 35 dB gain, which is adequate to cancel out the maximum attenuation encountered in standard building infrastructures; thus for 28 GHz, experimental measured data demonstrates that the technology described herein works for millimeter wave metasurfaces, indicating the desirability of such metasurfaces for non-terrestrial network direct-to-everything links.

Figure 11:
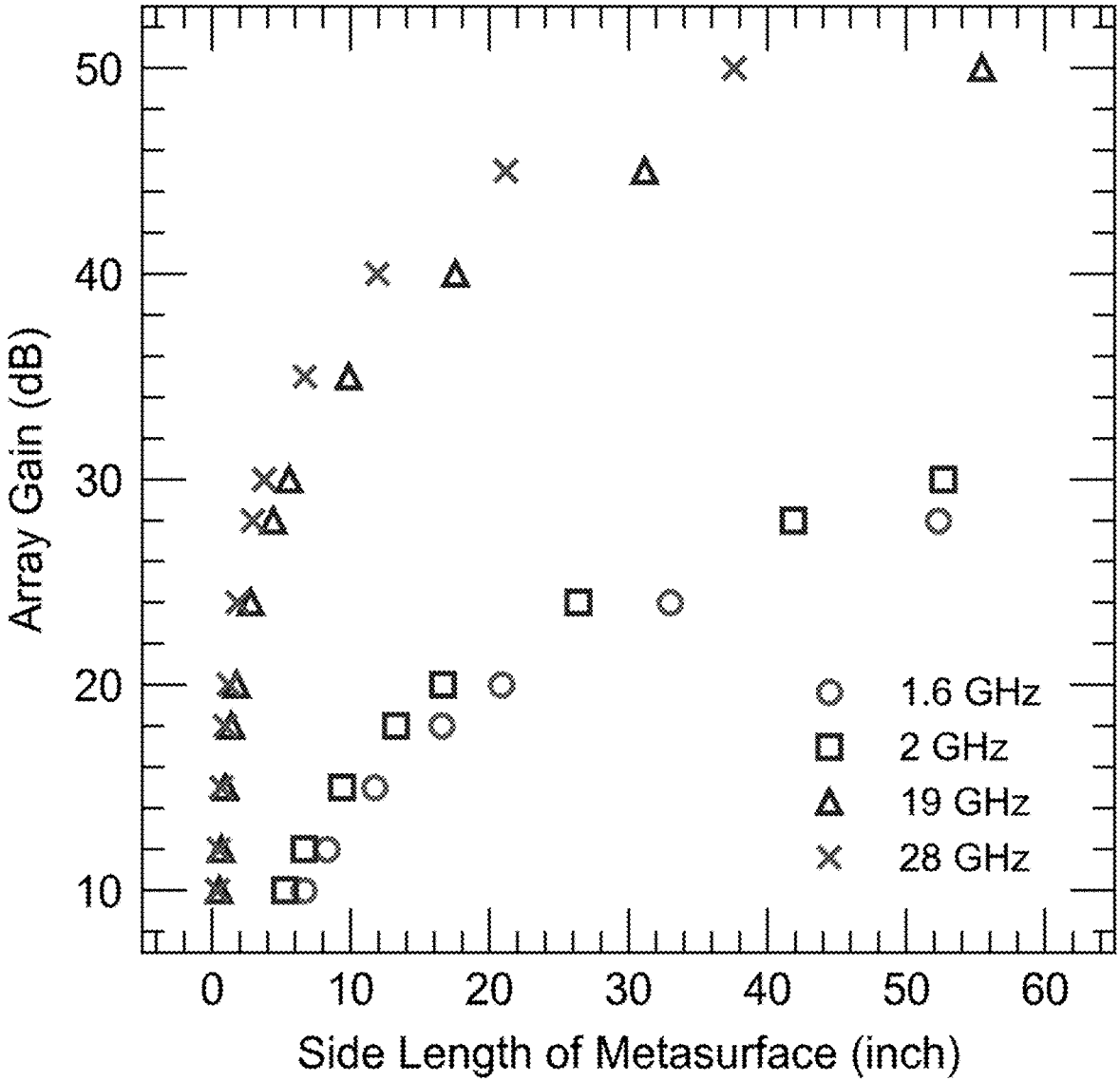
FIG. 11 is a graphical representation of an example comparison of the side length of a metasurface for a desired array gain for different non-terrestrial network lower frequency bands and higher frequency bands, in accordance with various example embodiments and implementations of the subject disclosure.
Figure 12:
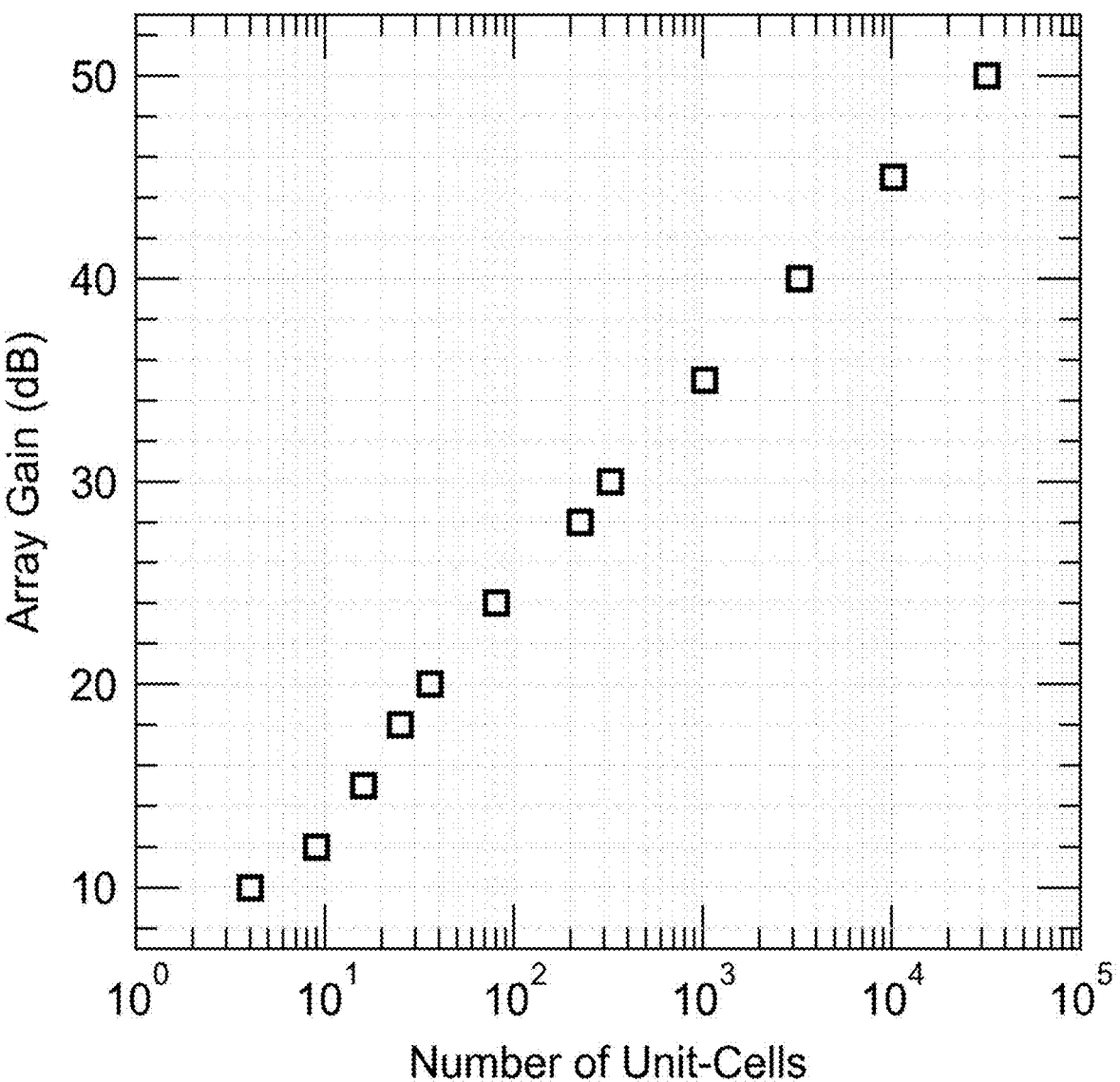
FIG. 12 is a graphical representation of example total numbers of unit-cells configured on metasurface panels for specific array gains for different frequencies, in accordance with various example embodiments and implementations of the subject disclosure.

FIG. 11 shows a comparison of the side length of the metasurface for a desired array gain for different non-terrestrial network frequency bands. FIG. 12 shows the total numbers of unit-cells configured on a panel for a specific array gain. More particularly, the metasurface described herein is scalable and thus offers a choice on the size and gain, in which FIG. 11 depicts the relationship between the physical dimensions of a metasurface and its performance in terms of array gain at various non-terrestrial network frequency bands. As can be seen in FIG. 11, for chosen frequencies, as the side length of the metasurface increases (for the same design and fabrication materials), the array gain also increases.

This attests to the relationship that a larger physical aperture (larger number of unit cells in the array) of the metasurface usually results in a higher gain. Notably, at higher frequencies such as 19 GHz and especially at 28 GHz, the gain increases significantly even with a smaller increase in the side length of the metasurface. This indicates that operating at higher frequencies may allow for more compact metasurfaces to achieve high gains, which facilitates a metasurface suitable for carrying by a user, such as if a user travels to a remote area where non-terrestrial network service is the best way to keep connected with the rest of the world. Similarly, in FIG. 12, the plot indicates that as the number of unit-cells in the metasurface increases, the array gain also increases. This relationship is expected, as more unit-cells typically mean a greater ability to shape and direct the electromagnetic waves, leading to higher gain. Note that the number of unit cells is not frequency dependent.

The limitation of each metasurface supporting only one frequency band will be diminished as 3GPP standardizes more bands for the non-terrestrial network broadband market. From a user's point of view, once a user subscribes to the non-terrestrial network, the service link frequency is already known for a designated region, such that the user can purchase a metasurface that performs for the relevant frequency in the region it will be deployed.

In general, non-terrestrial network airborne networks may be intra-continent, or span across oceans and multiple continents, as a non-terrestrial network is a global network. By way of example, consider the travels/life of a data packet in a system-level end-to-end network as generally represented in FIG. 13, in which acronyms include inter-satellite link (ISL), low earth orbit (LEO) and high-altitude platform systems (HAPS).

Figure 13:
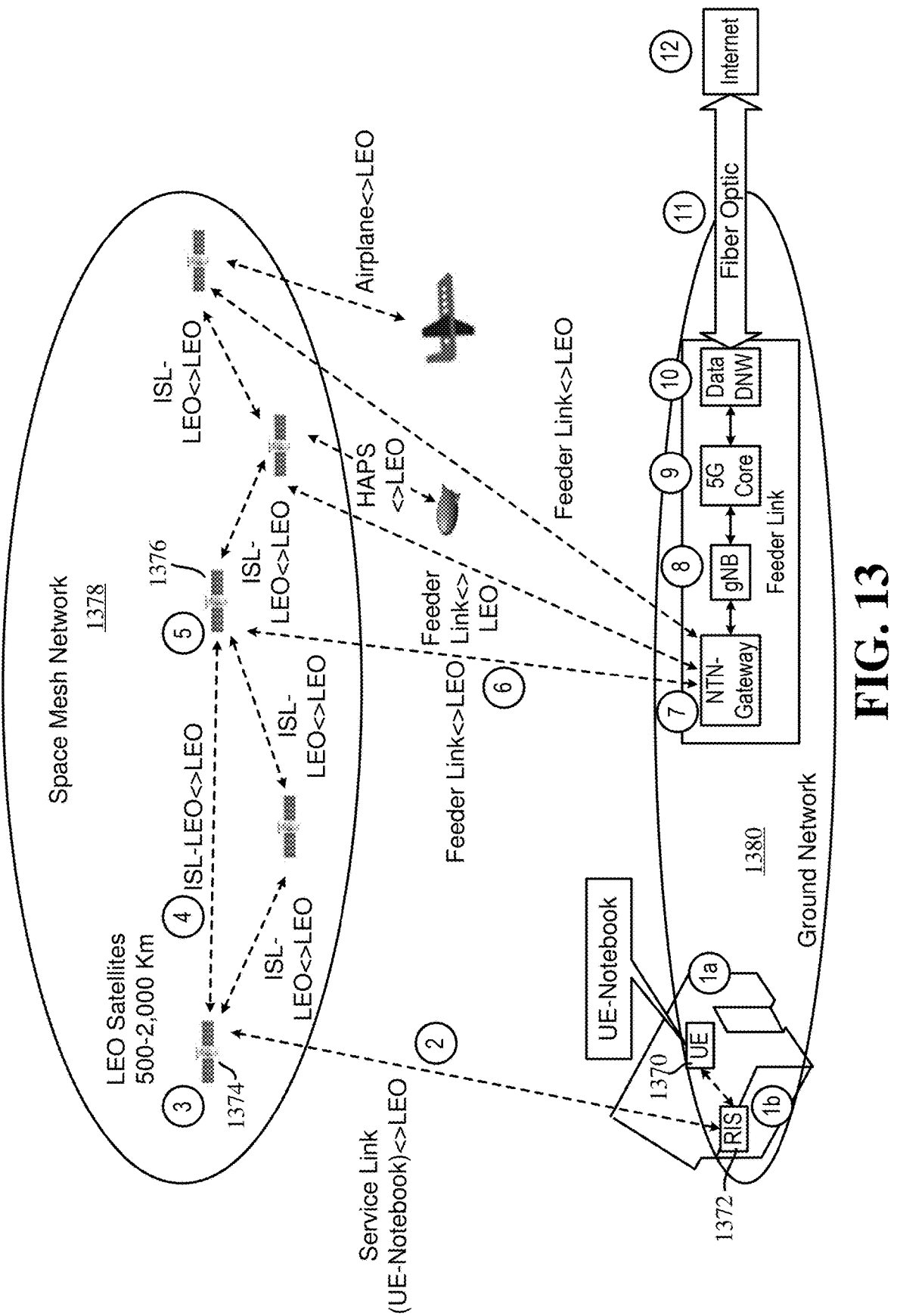
FIG. 13 is a representation of an example system-level end-to-end network showing how a data packet is communicated from an indoor notebook, via a metasurface, to and from a space mesh network, in accordance with various example embodiments and implementations of the subject disclosure.

The example of FIG. 13 shows a non-terrestrial network direct-to-device end-to-end deployment of a UE (notebook computer) and provides a life-of-a-packet description, in which circled numerals represent communications (alpha-numerically labeled arrows) and components/component operations (numerically labeled blocks). Analysis of the packet starts inside a home, e.g., on the East coast of the United States, in which a notebook computer 1370 is shielded by a house roof, walls, windows, and/or doors.

Labeled arrow (1a) represents packets leaving the notebook 1370. Arrow (1b) represents the packets being reflected out of the interior of the home using the metasurface panel technology (RIS 1372) described herein.

Arrow (2) represents the packets traveling through the (e.g., 3GPP-compliant) 5G NR air interface to a first LEO satellite 1374 using the service-link. Once inside the satellite (labeled block (3)), the 5G NR channel packet is repeated (amplified/frequency-converted).

At arrow (4), the 5G NR packet leaves the first LEO satellite 1374 through the space mesh network 1378 using the "Optical Inter-Satellite Arrow Links (ISL)", more specifically the "ISL-LEO-LEO" link. The space mesh network 1378 is basically a router/switch in space, represented by arrow (4) passing the packets through the space network; (note that multiple space network hops are possible, both LEO and GEO (geostationary earth orbit) satellite hops). The satellite physical interface is the inter-satellite links (ISL), similar to the optical interfaces used in ground networks.

Once the 5G NR packet gets close its destination, in this example it is in the western part of the United States, the packet terminates (labeled block (5)) inside the second LEO satellite 1376. As represented by arrow (6), the packet is then exported out of the second LEO satellite 1376 through the radio-frequency (RF) feeder-link downlink connection. Thus, as represented by block (7), the packets pass through the non-terrestrial network gateway, then at block (8) through the gNodeB (gNB 5G Radio Access Network), then at block (9) to the 5G Core (5GC). As represented by block (10), via the standard data network, the data network block is the transcoder-block from the mobile-network to standard ground data network. The 5G NR tunneled packet is demodulated back to the original baseband packet format and processed into the data network as a typical Internet Protocol (IP) packet, thus processed through commercial-off-the-shelf routers and switches.

As represented by arrow (11), once the IP packet routes through the traditional fiber data network (DNW), the packet enters the Internet connection. At block (12), once the data is retrieved from the Internet, the read-return packet can be sent through the same exact ground-network 1380 and space mesh network 1378, returning the read-return packet to the notebook UE 1370.

One or more embodiments can be embodied in a meta-surface, such as described and represented in the drawing figures herein. The metasurface can include an array of respective unit cells; the respective unit cells of the array can include respective metallic resonators configured to resonate at a specified frequency of an incoming electromagnetic wave. The respective unit cells can be arranged with respective phase values, configured to redirect respective portions of the incoming electromagnetic wave for any angle of arrival of the incoming electromagnetic wave from any position in a line-of-sight field of view, as respective redirected portions. The respective redirected portions can constructively interfere to facilitate array gain of a redirected signal that has increased redirected signal strength, at a receiving location, relative to incoming signal strength of the incoming electromagnetic wave at the receiving location.

The angle of arrival can correspond to any position of a satellite in the line-of-sight field of view. The specified frequency of the incoming electromagnetic wave can correspond to a satellite operating band. The satellite operating band can be an n255 satellite operating band or an n256 satellite operating band.

The specified frequency of the incoming electromagnetic wave can correspond to a millimeter wave operating band.

The metasurface can include a selectively removable metallic backplane that, when detached from the metasurface, results in the metasurface operating in a transmission mode that refracts the incoming electromagnetic wave as the redirected signal.

The metasurface can include a selectively removable metallic backplane that, when attached to the metasurface, results in the metasurface operating in a reflection mode that reflects the incoming electromagnetic wave as the redirected signal.

The metasurface can include a selectively removable metallic backplane coupled to the array of respective unit cells by one or more magnetic couplings.

The metasurface can be configured to be portable.

The metasurface can be configured to be passive with no need for power, and can have respective unit cells with respective phase values that are fixed.

One or more embodiments can be embodied in a system, such as described and represented in the drawing figures herein. The system can include a passive metasurface, which can include respective unit cells with respective resonators and respective fixed phase shift values. The respective resonators can be configured to resonate at a specified frequency to redirect an incoming electromagnetic signal corresponding to the specified frequency as a redirected signal. The system can include a removeable backplane that is able to be selectively attached to or detached from the metasurface, in which, in response to the removeable backplane being attached to the metasurface, the reconfigurable intelligent can operate in a reflection mode that reflects the incoming electromagnetic signal as the redirected signal, and in which, in response to the removeable backplane being detached from the metasurface, the reconfigurable intelligent can operate in a transmission mode that refracts the incoming electromagnetic signal as the redirected signal.

The metasurface can be configured to be portable.

The respective fixed phase shift values can be configured to redirect respective portions of the incoming electromagnetic signal as respective redirected portions that constructively interfere to facilitate array gain of the redirected signal that increases redirected signal strength at a receiving location relative to the incoming signal strength of the incoming electromagnetic signal.

The respective fixed phase shift values can be based on a line-of-sight angle of arrival of the incoming electromagnetic signal from varying non-terrestrial network satellite positions within a field of view.

The respective unit cells can include respective split-ring resonators.

One or more embodiments can be embodied in a system, such as described and represented in the drawing figures herein. The system can include a metasurface, which can include respective unit cells with respective resonators and respective phase shifts. The respective resonators can be configured to resonate at a specified frequency, to redirect a non-terrestrial network communication signal corresponding to the specified frequency, as respective portions of a redirected signal. The respective phase shifts can result in constructive interference of the respective redirected portions to produce the redirected signal. At a receiving location, the redirected signal can have a first signal strength, resulting from the constructive interference, relative to a second signal strength of the non-terrestrial network communication signal.

The metasurface can be configured to be portable.

The metasurface can operate in a transmission mode that refracts the non-terrestrial network communication signal as the redirected signal.

The metasurface can include a metallic backplane that results in the metasurface operating in a reflection mode that reflects the non-terrestrial network communication signal as the redirected signal.

The respective unit cells can be fixed with respect to the respective phase shifts.

As can be seen, the technology described herein provides a way for an indoor-located user equipment (e.g., a notebook computer) to communicate with a non-terrestrial network satellites using metasurface (reconfigurable intelligent surface) technology. The technology described herein includes metasurface implementations that can be passive and/or portable, and/or can be manually configured to operate either in reflection mode (R-Mode) or in transmission mode (T-mode) to boost the RF signal gain for reliable non-terrestrial network services.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A metasurface, comprising:
an array of respective unit cells, the respective unit cells of the array comprising:
respective metallic resonators configured to resonate at a specified frequency of an incoming electromagnetic wave,
wherein the respective unit cells are arranged with respective phase values, configured to redirect respective portions of the incoming electromagnetic wave for any angle of arrival of the incoming electromagnetic wave from any position in a line-of-sight field of view, as respective redirected portions, and
wherein the respective redirected portions constructively interfere to facilitate array gain of a redirected signal that has increased redirected signal strength, at a receiving location, relative to incoming signal strength of the incoming electromagnetic wave at the receiving location.

2. The metasurface of claim 1, wherein the angle of arrival corresponds to any position of a satellite in the line-of-sight field of view.

3. The metasurface of claim 2, wherein the specified frequency of the incoming electromagnetic wave corresponds to a satellite operating band.

4. The metasurface of claim 3, wherein the satellite operating band is an n255 satellite operating band or an n256 satellite operating band.

5. The metasurface of claim 2, wherein the specified frequency of the incoming electromagnetic wave corresponds to a millimeter wave operating band.

6. The metasurface of claim 1, wherein the metasurface comprises a selectively removable metallic backplane that, when detached from the metasurface, results in the metasurface operating in a transmission mode that refracts the incoming electromagnetic wave as the redirected signal.

7. The metasurface of claim 1, wherein the metasurface comprises a selectively removable metallic backplane that, when attached to the metasurface, results in the metasurface operating in a reflection mode that reflects the incoming electromagnetic wave as the redirected signal.

8. The metasurface of claim 1, wherein the metasurface comprises a selectively removable metallic backplane coupled to the array of respective unit cells by one or more magnetic couplings.

9. The metasurface of claim 1, wherein the metasurface is configured to be portable.

10. The metasurface of claim 1, wherein the metasurface is configured to be passive with no need for power, and has respective unit cells with respective phase values that are fixed.

11. A system, comprising:
a passive metasurface, comprising respective unit cells with respective resonators and respective fixed phase shift values, the respective resonators configured to resonate at a specified frequency to redirect an incoming electromagnetic signal corresponding to the specified frequency as a redirected signal; and
a removeable backplane that is able to be selectively attached to or detached from the metasurface,
wherein, in response to the removeable backplane being attached to the metasurface, the reconfigurable intelligent operates in a reflection mode that reflects the incoming electromagnetic signal as the redirected signal, and
wherein, in response to the removeable backplane being detached from the metasurface, the reconfigurable intelligent operates in a transmission mode that refracts the incoming electromagnetic signal as the redirected signal.

12. The system of claim 11, wherein the metasurface is configured to be portable.

13. The system of claim 11, wherein the respective fixed phase shift values are configured to redirect respective portions of the incoming electromagnetic signal as respective redirected portions that constructively interfere to facilitate array gain of the redirected signal that increases redirected signal strength at a receiving location relative to the incoming signal strength of the incoming electromagnetic signal.

14. The system of claim 13, wherein the respective fixed phase shift values are based on a line-of-sight angle of arrival of the incoming electromagnetic signal from varying non-terrestrial network satellite positions within a field of view.

15. The system of claim 11, wherein the respective unit cells comprise respective split-ring resonators.

16. A system, comprising:

a metasurface, comprising respective unit cells with respective resonators and respective phase shifts, the respective resonators configured to resonate at a specified frequency, to redirect a non-terrestrial network communication signal corresponding to the specified frequency, as respective portions of a redirected signal, wherein the respective phase shifts result in constructive interference of the respective redirected portions to produce the redirected signal, and wherein, at a receiving location, the redirected signal has a first signal strength, resulting from the constructive interference, relative to a second signal strength of the non-terrestrial network communication signal.

17. The system of claim 16, wherein the metasurface is configured to be portable.

18. The system of claim 16, wherein the metasurface operates in a transmission mode that refracts the non-terrestrial network communication signal as the redirected signal.

19. The system of claim 16, wherein the metasurface comprises a metallic backplane that results in the metasurface operating in a reflection mode that reflects the non-terrestrial network communication signal as the redirected signal.

20. The system of claim 16, wherein the respective unit cells are fixed with respect to the respective phase shifts.

* * * * *